United States Patent
Will et al.

(10) Patent No.: US 11,201,737 B1
(45) Date of Patent: Dec. 14, 2021

(54) SYSTEMS AND METHODS FOR GENERATING TOKENS USING SECURE MULTIPARTY COMPUTATION ENGINES

(71) Applicant: Acronis International GmbH, Schaffhausen (CH)

(72) Inventors: Mark A. Will, Singapore (SG); Sanjeev Solanki, Singapore (SG); Kailash Sivanesan, Singapore (SG); Serguei Beloussov, Costa del Sol (SG); Stanislav Protasov, Moscow (RU)

(73) Assignee: ACRONIS INTERNATIONAL GMBH, Schaffhausen (CH)

( * ) Notice: Subject to any disclaimer, the term of this patent is extended or adjusted under 35 U.S.C. 154(b) by 28 days.

(21) Appl. No.: 16/878,201

(22) Filed: May 19, 2020

(51) Int. Cl.
| | |
|---|---|
| *H04L 9/08* | (2006.01) |
| *H04L 9/06* | (2006.01) |
| *G06F 21/55* | (2013.01) |
| *G06F 21/62* | (2013.01) |
| *H04L 29/06* | (2006.01) |

(52) U.S. Cl.
CPC .......... *H04L 9/0863* (2013.01); *G06F 21/552* (2013.01); *G06F 21/6245* (2013.01); *H04L 9/0643* (2013.01); *H04L 9/085* (2013.01); *H04L 9/088* (2013.01); *H04L 63/0428* (2013.01); *G06F 2221/034* (2013.01); *H04L 2209/46* (2013.01)

(58) Field of Classification Search
CPC ....... H04L 9/0863; H04L 9/085; H04L 9/088; H04L 63/0428; H04L 9/0643; H04L 2209/46; G06F 21/6245; G06F 21/552; G06F 2221/034

USPC ......................................................... 713/164
See application file for complete search history.

(56) References Cited

U.S. PATENT DOCUMENTS

| | | | | |
|---|---|---|---|---|
| 8,745,094 | B2* | 6/2014 | Mattsson | G07F 7/1008 |
| | | | | 707/802 |
| 9,053,124 | B1* | 6/2015 | Dornquast | G06F 11/1453 |
| 9,292,707 | B1* | 3/2016 | Fontecchio | H04L 9/30 |
| 9,721,249 | B2* | 8/2017 | Mattsson | H04W 12/03 |
| 2005/0166263 | A1* | 7/2005 | Nanopoulos | H04L 9/3228 |
| | | | | 726/7 |
| 2009/0300723 | A1* | 12/2009 | Nemoy | H04L 63/102 |
| | | | | 726/4 |
| 2012/0114119 | A1* | 5/2012 | Ahuja | H04L 63/0853 |
| | | | | 380/44 |

(Continued)

*Primary Examiner* — Shahriar Zarrineh
(74) *Attorney, Agent, or Firm* — Arent Fox LLP; Michael Fainberg (57) ABSTRACT

Disclosed herein are systems and methods for generating tokens using SMPC compute engines. In one aspect, a method may hash, by a node, a data input with a salt value. The method may split, by the node, the hashed data input into a plurality of secret shares, wherein each respective secret share of the plurality of secret shares is assigned to a respective SMPC compute engine of a plurality of SMPC compute engines. The respective SMPC compute engines may be configured to collectively hash the respective secret share with a secret salt value, unknown to the plurality of SMPC compute engines. The respective SMPC compute engine may further receive a plurality of hashed secret shares from remaining SMPC compute engines of the plurality of SMPC compute engines, and generate a token, wherein the token is a combination of the hashed respective secret share and the plurality of hashed secret shares.

15 Claims, 5 Drawing Sheets

(56) References Cited

U.S. PATENT DOCUMENTS

| | | | |
|---|---|---|---|
| 2012/0259782 A1* | 10/2012 | Hammad | G06Q 20/382 705/44 |
| 2013/0124474 A1* | 5/2013 | Anderson | G06F 16/24534 707/634 |
| 2014/0122442 A1* | 5/2014 | Takenouchi | G06F 16/2365 707/687 |
| 2015/0095252 A1* | 4/2015 | Mattsson | G06Q 50/265 705/325 |
| 2016/0019396 A1* | 1/2016 | Davis | H04L 63/0807 713/193 |
| 2016/0085915 A1* | 3/2016 | Seow | G16Z 99/00 705/3 |
| 2016/0085971 A1* | 3/2016 | Saxena | G06F 21/602 726/26 |
| 2016/0147945 A1* | 5/2016 | MacCarthy | G06F 21/6254 705/51 |
| 2016/0182231 A1* | 6/2016 | Fontecchio | H04L 9/3239 713/172 |
| 2017/0039568 A1* | 2/2017 | Tunnell | G06F 21/33 |
| 2017/0053138 A1* | 2/2017 | Rozenberg | H04L 63/0428 |
| 2017/0068655 A1* | 3/2017 | Wang | G06F 40/289 |
| 2017/0262659 A1* | 9/2017 | Kuris | H04L 63/0428 |
| 2018/0062832 A1* | 3/2018 | Hatcher | H04L 63/0428 |
| 2018/0285597 A1* | 10/2018 | Mahonin | G06F 21/602 |
| 2018/0302382 A1* | 10/2018 | Lehmann | G06F 21/6209 |
| 2018/0359811 A1* | 12/2018 | Verzun | H04L 12/28 |
| 2019/0278929 A1* | 9/2019 | Kakumani | G06F 21/6218 |
| 2019/0327243 A1* | 10/2019 | Kocemba | H04L 63/104 |
| 2019/0340013 A1* | 11/2019 | Celia | G06Q 20/308 |
| 2019/0385159 A1* | 12/2019 | Beatty | G06Q 20/32 |
| 2020/0014543 A1* | 1/2020 | Paterson | H04L 9/3226 |
| 2020/0082922 A1* | 3/2020 | Bacastow | G06F 21/6245 |
| 2020/0226284 A1* | 7/2020 | Yin | G06F 21/6254 |
| 2020/0320043 A1* | 10/2020 | Sen | G06F 16/1824 |
| 2020/0401715 A1* | 12/2020 | Linton | G06F 21/6218 |
| 2020/0404007 A1* | 12/2020 | Singh | G06F 21/552 |

\* cited by examiner

SYSTEMS AND METHODS FOR GENERATING TOKENS USING SECURE MULTIPARTY COMPUTATION ENGINES

FIELD OF TECHNOLOGY

The present disclosure relates to the field of secure multiparty computation (SMPC), and, more specifically, to systems and methods for generating tokens using SMPC compute engines.

BACKGROUND

When processing, storing, or transmitting customer/user information, IT companies must often separate user identification information from user data to comply with privacy and data security regulations. For example, a piece of data regarding salary such as (Bob, $90 k) can be quite revealing as it indicates that Bob earns a salary of $90 k. To perform computations on information, such as a dataset, identification is not necessarily needed. For example, performing a computation using the value $90 k can happen successfully regardless of whether the data input is (Bob, $90 k) or (Anonymous, $90 k). Given that certain countries have very strict privacy and data security laws aimed at protecting personal information, with fines and other punishments in place for breaching the laws, and given that individuals may not wish to give up personal information, anonymizing personal identifiable information is very important.

When multiple sources are involved that collectively link data, it becomes even more important to keep each source's identification confidential by converting the identification to some value that does not reveal the original input and is unique and deterministic—allowing for the joining of data. For example, several companies may wish to determine an average employee salary amongst each other to evaluate whether their own salaries are competitive in the market. However, in order to determine the average salary across the companies, their salary datasets need to be combined to identify employees working for multiple companies. To preserve individual confidential data and their own company names, the identification information should be anonymized.

A common approach to this problem is using a tokenizer, which takes some input and gives an obfuscated, seemingly random output. Therefore, an email or identification number becomes a random token. But for this to be useful in the case of multiple data sources, the same input needs to give the same output in order for the two sources to be joined together. Hence a random mapping cannot be used, unless each uploader possesses the same mapping.

Unfortunately, a single mapping becomes a single point of failure because all tokens can be revealed to a malicious entity if the mapping is compromised. Furthermore, searchable encryption cannot be used easily in an secure multiparty computation (SMPC) environment because the data needs to the processed in the same order across multiple nodes, where identification values may be used for ordering the dataset, thus most searchable encryption techniques will not be able to easily guarantee this ordering.

SUMMARY

To address these shortcomings, aspects of the present disclosure describe methods and systems for generating tokens using SMPC compute engines.

In one exemplary aspect, a method for token generation using SMPC compute engines may apply a deterministic function, by a data source node, to a data input. The method may split, at the data source node, the output of the deterministic function into a plurality of secret shares, wherein each respective secret share of the plurality of secret shares is assigned to a respective SMPC compute engine of a plurality of SMPC compute engines. The respective SMPC compute engine may be configured to apply another deterministic function to the respective secret share. The remaining SMPC compute engine may transmit the respective secret share to the remaining SMPC compute engines of the plurality of SMPC compute engines. The respective SMPC compute engine may further receive a plurality of secret shares from the remaining SMPC compute engines of the plurality of SMPC compute engines, and generate a token, wherein the token is a combination of the respective secret share and the plurality of secret shares.

In some aspects, the respective SMPC compute engine of the plurality of SMPC compute engines is one data source of a plurality of data sources. Alternatively, the respective SMPC compute engines of the plurality of SMPC compute engines may be separate entities that should not have access to private inputs or private outputs.

In some aspects, data inputs which contain identifiable information, but are required for joining data together are deterministically converted into a token. Data from one data source and at least one other data source of the multiple data sources should generate the same token if the method is given the same input value.

In some aspects, the token may be partially generated on the data source node using a deterministic function (e.g., MD5, SHA1, AES with the same key and initialization vector etc.), before being split into a plurality of secret shares, wherein each respective secret share of the plurality of secret shares is assigned to a respective SMPC compute engine of the plurality of SMPC compute engines. The method may then continue the token generation process within the SMPC compute engines. For example, the respective SMPC compute engine may use a SMPC function to compute: (1) a hash value (e.g., based on MD5, SHA1, etc.) of a respective secret share with a secret salt value that is unknown to any other SMPC compute engine of the plurality of SMPC compute engines, (2) an encryption function with a deterministic output (e.g., AES CBC with a secret key and secret static initialization vector) or (3), any combination of deterministic functions involving secret values.

The method may generate the secret token when each SMPC compute engine sends the remaining SMPC compute engines of the plurality of SMPC compute engines its secret share of the plurality of secret shares. The method may receive a plurality of secret shares from other SMPC compute engines, wherein joining the secret share with the plurality of secret shares will generate the secret token. Each SMPC compute engine receives the same token, which can be included with any other data values for uses such as, but not limited to, storing a dataset, joining multiple datasets together, or ordering data inputs for the use in another SMPC function.

Continuing with the previously mentioned example, suppose that multiple companies desire to find an average employee salary amongst each other. Each company may possess a dataset containing social security numbers and salaries for computer engineers. The datasets are to be uploaded into an SMPC compute system. A contractor may be employed at the multiple companies, and therefore, their separate salaries need to be totaled first to form their overall salary, before the average can be computed. In this case, the social security numbers are identifiable information and should not be stored. However, the social security numbers may be required to join together the salaries someone may be receiving from different companies. Thus, the tokens may be used to identify two salaries which need to be securely summed before the secure average function can proceed. Similarly, a token may be required when using an SMPC function to compute the average where the secret shares need to be aligned when entering the function. For example, if the salary $80 k of an employee is split into $25 k, $40 k, and $15 k, the three shares need to be processed together on the plurality of SMPC compute engines. Accordingly, an SMPC compute engine that should receive $25 k (i.e., the first secret share) cannot receive $45 k because then an incorrect salary of $100 k is the result. The inputs may be sorted by the token, thus, the tokens on each of the SMPC compute engines need to be identical.

The method may transmit a static value (e.g., a salt value for a hash function) to at least one other data source, in order to allow data to be joined from the multiple sources. For example, at least one other data source node may be configured to hash at least one other data input with a salt value, and split the hashed value into a plurality of secret shares, wherein each respective secret share is assigned to a respective SMPC compute engine of the plurality of SMPC compute engines. Therefore, for tokens across multiple sources to be linked together, the same salt value is required.

In some aspects, all SMPC compute engines of the plurality of SMPC compute engines receive the same token which represents the same plaintext input identifier value. In some aspects, the data input is an identifier of that should be confidential.

In some aspects, prior to splitting the token input into a plurality of secret shares, the method may combine the input with a passcode provided by a user of the node (e.g., data source node). In the case of a hash function, this passcode can be hashed with the token input, where the output may then be split into the plurality of secret shares.

In some aspects, the respective SMPC compute engine is further configured to store a plurality of generated tokens with corresponding data inputs and in response to detecting that the stored plurality of generated tokens is being overwritten, or that generated tokens are not part of a wider dataset, generate an alert indicating malicious behaviour.

In some aspects, the data input is an identifier of a respective row or column in a dataset being uploaded by a data source to the plurality of SMPC compute engines.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for generating tokens using SMPC compute engines. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

In secure multiparty computation (SMPC), secret sharing refers to distributing a secret amongst a group of participants, where each participant is allocated a share of the secret. Individual shares are of no use on their own, as the secret can only be reconstructed when a number of shares are combined together. SMPC frameworks allow multiple parties to jointly compute a function, such that their inputs remain private, using secret sharing. More specifically, data is protected by being split into secret shares, where each party receives a subset of these shares. Therefore each party cannot see the real data. For example, the secret "10" can be split into secret shares "3," "2," and "5," whose sum (i.e., 3+2+5) gives 10.

Figure 1:
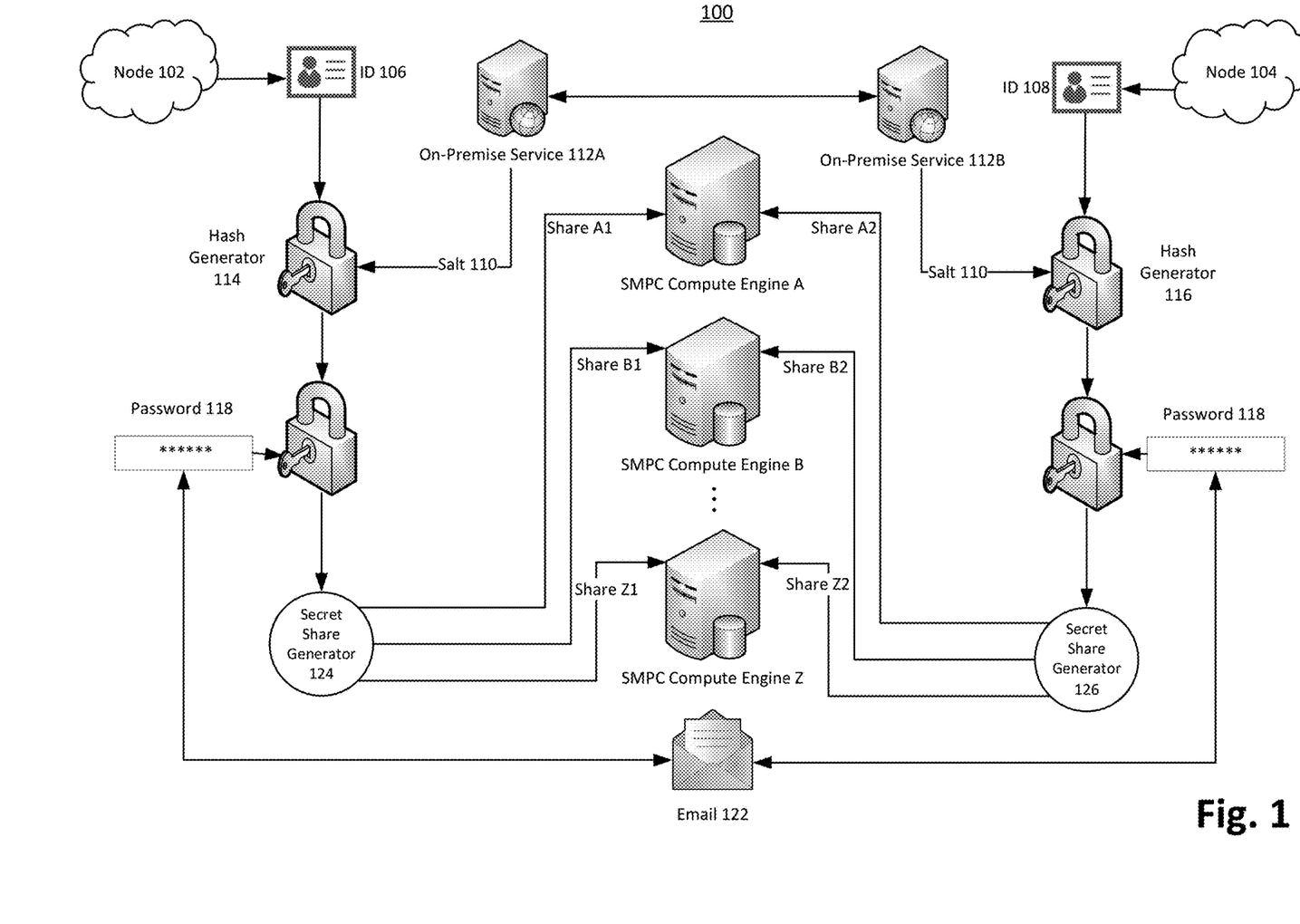
FIG. 1 is a block diagram illustrating a system for generating secret shares of an input value for SMPC compute engines, in accordance with aspects of the present disclosure.

FIG. 1 is a block diagram illustrating system 100 for generating secret shares of an input value for SMPC compute engines, in accordance with aspects of the present disclosure. FIG. 1 is an example of a flow which has two sources of data (e.g., node 102, 104). Both nodes may be any type of electronic device that can store and share data such as computers and servers. One skilled in the art will appreciate that the methods to be discussed are applicable when only one node is involved in system 100 and also when more than two nodes are involved.

Nodes 102 and 104 may possess plaintext data such as ID 106 and ID 108, respectively. The plaintext data may be identification numbers of the respective nodes, or be identification numbers of records in a dataset, and should be kept confidential. This is done by creating a token for the respective IDs. A token is a representation of some other data. For example, a token may be a random number or a series of randomized characters representing sensitive information. The output from hashing or encrypting may also be a token.

Given that the target platform is an SMPC environment, the SMPC compute engines (e.g., engines A, B, . . . Z) themselves may be used to securely generate tokens. An SMPC compute engine is a module on a server where the SMPC protocol is actually computed. For example, an SMPC compute engine may perform a secure function, which is a mathematical operation (e.g., determining the average for a plurality of input numerical values), on a secret share received from node 102. The server may be accessed via a network connection (e.g., the Internet). Each SMPC compute engine A, B, Z may be able to communicate with one another, but will not exchange information which will reveal secret shares unless specified in the function. This ensures that the SMPC compute engines individually do not know any private secret.

However, in the case where all the SMPC compute engines are breached, thereby exposing sensitive data associated with ID 106 and ID 108, the tokens themselves should still remain protected. This is done by having nodes 102 and 104 involved with the token generation process, and the option of having a password/phrase 118 that is not stored within the compute engines for the tokenization process.

Accordingly, node 102 hashes ID 106 using hash generator 114, which may be a module that applies a cryptographic hash function on an input value. Examples of the cryptographic hash functions include, but are not limited to, MD5, SHA-1, and Whirlpool. Hashing is a cryptographic method for taking some arbitrary length input, and outputting a fixed length, seemingly random output. Hashing is known as a one-way function, as reversing the hashing process is very difficult.

Node 102 may utilize a salt value, namely, salt 110. A salt value is a combination of characters used in hashing to prevent pre-generated tables being used to reverse the hash function. While node 102 is computing the hash of ID 106, node 104 may be hashing ID 108 (node 102 and node 104 may also hash their respective inputs at different times). To ensure consistency, when hashing, both hash generator 114 and 116 must use the same hash function. Furthermore, both node 102 and node 104 must use the same salt 110. Node 102 may transmit salt 110 to node 104 via on-premise service node 112A (received by on-premise service node 112B) or other mediums such as email 122. On-Premise service nodes 112A and 112B may store salt 110 for future use. If salt 110 is shared over email 122, on-premise service nodes 112A and 112B are not needed in system 100.

In one example, referring to node 102, suppose that ID 106 is the mixed order of numbers "2812." Salt 110 may be another mixed order of numbers "3432." When applying salt 110 to ID 106, the numbers of salt 110 may be appended to the numbers of ID 106 yielding "28123432." Suppose that subsequent to applying a hash function via hash generator 114, the result is "74291869." It should be noted that this example is oversimplified for easier comprehension. In a real setting, ID 106 and salt 110 may each include several characters such as numbers, letters, symbols, and bytes. Furthermore, hashes tend to be longer and more complex numbers. For example, when using a hash function such as SHA-256 on the value "28123432," the result is "6c13285e-199a7fdd53cebcea0c86cfeeaf3cea6e7cde83c5846b41cc1f-e8df7."

Nodes 102 and 104 may then split the hashed data input into a plurality of secret shares, wherein each respective secret share of the plurality of secret shares is assigned to a respective SMPC compute engine of a plurality of SMPC compute engines. The plurality of SMPC compute engines comprise of at least two SMPC compute engines. In some aspects, the number of secret shares in the plurality of secret shares is equal to the number of SMPC compute engines to be used. FIG. 1 depicts engines A-Z. However, it may be possible that more engines may be utilized or fewer engines may be utilized. For simplicity, suppose that only three compute engines are utilized by nodes 102 and node 104 to perform secure functions (i.e., SMPC compute engine A, B and Z). Nodes 102 and 104 may communicate with the respective SMPC compute engines using a wide area network (e.g., the Internet) or a local area network (LAN).

The actual splitting may be performed by secret share generators 124 and 126, which are modules that are configured to split an input value using techniques such as additive secret sharing, multiplicative secret sharing, etc. Secret share generators 124 and 126 may further be configured to assign each respective secret share to a respective SMPC compute engine and transmit the secret shares according to their assignments (e.g., share A1 is transmitted to SMPC compute engine A). Generators 124 and 126 may coordinate to ensure that the same SMPC compute engines are used (e.g., A, B, and Z) by both nodes.

In some aspects, each transmission of a secret share to a respective SMPC compute engine may further comprise identification information (e.g., node ID, the IP address, MAC address, etc.) of the other SMPC compute engines that received the other secret shares. This way, SMPC compute engine A is able to determine that SMPC compute engines B and Z received the other portions of the secret (e.g., shares B1, B2, Z1, and Z2).

Following the overarching example, node 102 may split the hashed data input "74291869" using a technique such as additive secret sharing. For example, node 102 may split the hashed data input into three secret shares (e.g., share A1, share B1, and share Z1). These shares may be "32150327" as share A1, "11041241" as share B1, and "31100301" as share Z1—which all add up to "74291869." Likewise, node 104 may hash ID 108 using the salt 110 value "3432," and may split the hashed value into three secret shares: share A2, B2, and Z2.

In some aspects, the hashed data inputs may be combined with a password or a phrase that the data uploader (e.g., a user of node 102 or node 104) manually enters. For example, password 118 may be shared by node 102 with node 104 via an out-of-system method such as a phone call, text, or email 122. Suppose that password 118 is "1010." Prior to secret share generators 124 and 126 splitting the hashed value, password 118 may be appended by the respective nodes to the end/beginning of the respective hashed data inputs. For example, "1010" may applied as an additional message or round from the hash generated by 114. Alternatively, processes 114 and 118 can be combined such that the input message to the hash function would be "281234321010" for ID 106. This adds a level of complexity to the data security to prevent a brute-force attack on the hashed data input.

Figure 2:
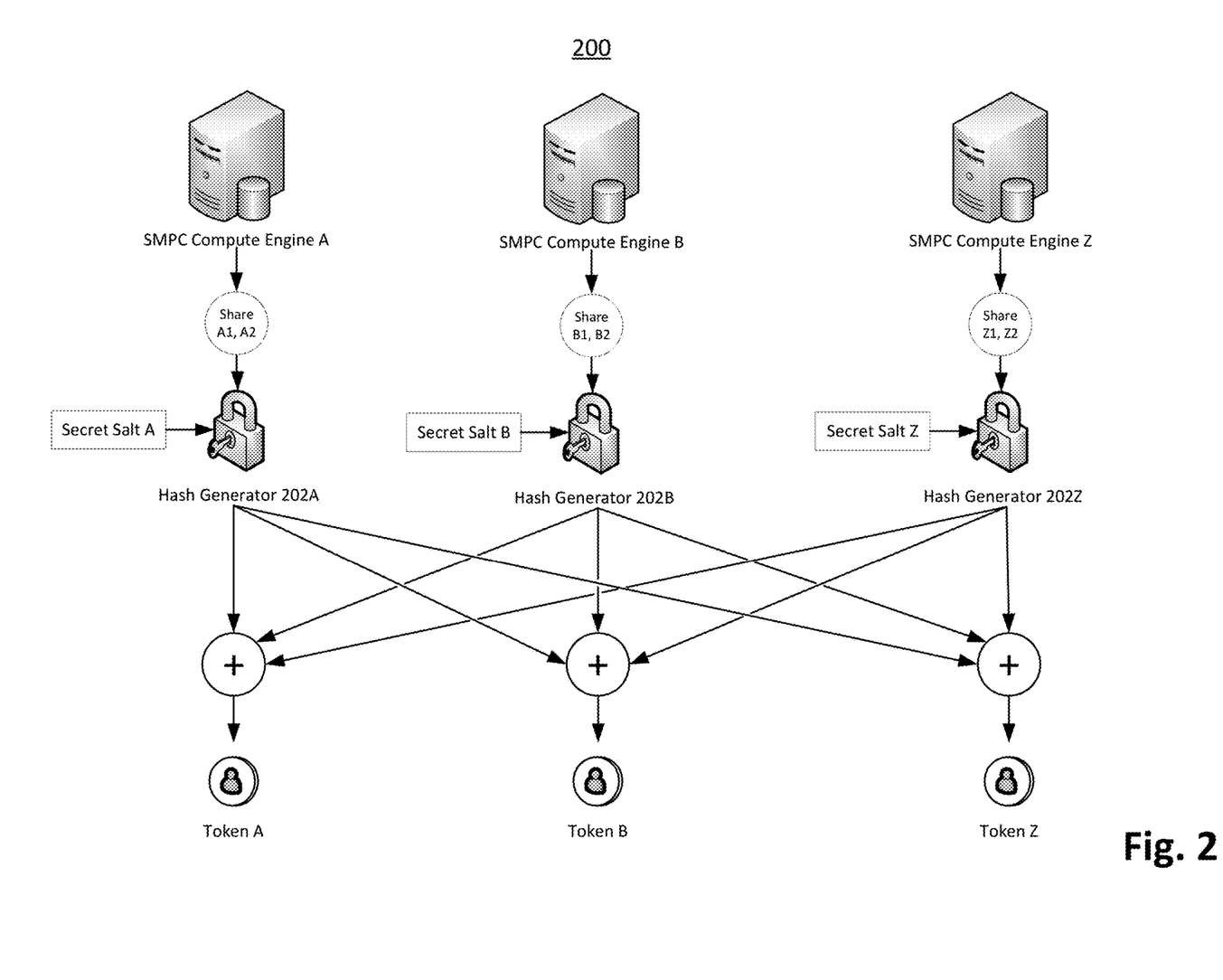
FIG. 2 is a block diagram illustrating a system for generating tokens using the SMPC compute engines, in accordance with aspects of the present disclosure.

FIG. 2 is a block diagram illustrating system 200 for generating tokens using the SMPC compute engines, in accordance with aspects of the present disclosure. In system 200, the SMPC compute engines may apply any deterministic function such as hashing and encrypting, or any combination of deterministic functions.

In some aspects, the SMPC compute engines may take the hashing approach. More specifically, a respective SMPC compute engine is configured to hash the respective secret share with a secret salt value unique to the respective SMPC compute engine and/or unknown to any other SMPC compute engine of the plurality of SMPC compute engines (as it exists as a secret share). Suppose that only node 102 is in system 200. Referring to the overarching example, "32150327" as share A1 is sent to SMPC compute engine A, "11041241" as share B1 is sent to SMPC compute engine B, and "31100301" as share Z1 is sent to SMPC compute engine Z. Each SMPC compute engine may possess a unique secret share salt value (i.e., secret salt A, B, Z). For example, engine A may have a secret salt value of "1234," engine B may have "6545," and engine Z may have "89482." It should be noted that the secret salt values shown above are simplified, but in reality may be any arbitrary length and any combination of letters, numbers, symbols, and bytes. Considering the perspective of engine A, secret salt A may be appended to the received hash value yielding "321503271234." The shares with appended salts A1, B1, and Z1 may be jointly hashed with the hash generators 202A, 202B, and 202Z using a SMPC protocol. Alternatively, the values A1, B1, and Z1 could be the output from a hash round in hash generator 114, where the secret salt is the input for the final rounds in the hash function. In some aspects, each of the SMPC compute engines of the plurality of SMPC compute engines use the same hashing function, and communicate with each of the other hash generators to securely compute the hash function using SMPC protocols. For example, each hash generation module 202A, 202B, and 202Z may communicate with one another to select a single hashing function. Suppose that subsequent to each SMPC compute engine collectively computing the hash value using their respective secret salt value, the respective results are "324351253," "87585323," and "234324320." Each respective SMPC compute engine may transmit their calculated value to the other SMPC compute engines and may receive a plurality of hashed secret shares from remaining SMPC compute engines of the plurality of SMPC compute engines. For example, engine A may transmit "324351253" to engines B and Z, and may receive "87585323" and "234324320" from engines B and Z, respectively. Each SMPC compute engine may then generate a token, wherein the token is a combination of the hashed respective secret share and the plurality of hashed secret shares. For example, each SMPC compute engine may add up the three values to get the sum "646260896." This sum is the token that represents ID 106. Token A, B, and Z are all the same value and are used by SMPC compute engines A, B, and Z to identify ID 106.

Suppose that more than one node is using system 200. For example, node 104 may also transmit secret shares of its determined hash value to engines A, B, and Z. In some aspects, the SMPC compute engines each generate individual tokens for each values submitted by the nodes. For example, just as the process for generating a token for ID 106 is described above, the SMPC compute engines may generate another token using solely the secret shares of ID 108. This results in a second token solely for ID 108.

In some aspects, one token is generated for each of the plurality of inputs submitted by a plurality of nodes. More specifically, in response to determining that node 102 and node 104 are both seeking to compute a secure function together, system 200 may join the individually received datasets from each node. For example, engine A may receive share A1 from node 102 and share A2 from node 104. Engine 104 may then add these values, or append them one after another, depending on their token. Following the overarching example of multiple companies determining the average salary of their employees, suppose that a dataset of a first company is:

| | |
|---|---|
| 123-45-6789 | $90k |
| 987-65-4321 | $40k |
| 001-02-0003 | $85k |

Suppose that a dataset of a second company is:

| | |
|---|---|
| 004-05-0006 | $87k |
| 987-65-4321 | $39k |
| 991-992-9993 | $95k |

The respective datasets indicate the salary provided to each employee, where each employee is identified by their social security number. The social security numbers should be confidential, and thus tokens should be generated for each employee. It should be noted that although there are six entries, only five employees are actually listed. The employee with the social security number 987-65-4321 works for both companies and has a combined salary of $79 k. Thus, in general, if any tokens from node 102's dataset match any tokens from node 104's dataset, then their secret shares may be added together (i.e. adding the salaries from multiple companies for the same social security number), else they are appended as a separate row/column in the dataset, thus, forming a dataset from both node 102 and node 104, without revealing any personal identifiable information.

In some aspects, the SMPC may take the encryption approach. In this case, each respective SMPC compute engine is configured to encrypt the respective secret share (e.g., share A1 and A2) using an encryption scheme (e.g., Advanced Encryption Standard (AES)), wherein an initialization vector and key of the encryption scheme are in a secret share unique to the respective SMPC compute engine. For example, instead of secret salt A, B, and Z, each engine may use an initialization vector and key (e.g., vector and key A, B, and Z). Subsequent to encrypting each share collectively using SMPC protocols at an engine, the engine may transmit the encrypted secret share to the remaining SMPC compute engines and receive a plurality of encrypted secret shares from the remaining SMPC compute engines of the plurality of SMPC compute engines. Each respective SMPC compute engine may then generate the token, wherein the token is a combination (e.g., by adding or appending) of the encrypted respective secret share and the plurality of encrypted secret share. For an asymmetric encryption scheme, the public key can exist in secret shares, with the private discarded.

Once the inputted values to system 200 (e.g., ID 106 and 108) have been hashed, encrypted, or both, the values may be then revealed to each party (e.g., node 102 and 104). Therefore, each party gets the same token, which is useful when data needs to be in the same order for processing in an SMPC environment. Similarly, when uploading datasets into an SMPC environment such as system 200, the tokens may be revealed and stored with the dataset on SMPC compute engines A, B and Z, thus, not being revealed back to node 102 or 104. In particular, to run a secure query over some input data (e.g., determine an average salary of a plurality of employees across multiple companies), which has a column as a token for searching or lookup, the order of which the matching rows (or columns depending on how the dataset is divided) are fed into the SMPC secure process is critical. Having the same token on each SMPC compute engine means the order of rows (or columns) can be preserved by sorting on the token. For example, if the same token is received for a particular dataset, the SMPC compute engines may proceed to perform a secure function and combine the results. For example, if two sources of data node 102 and node 104 contain separate parts of information on individuals, such as salary and property valuation respectively, this can be joined together to form a larger dataset containing an individual's salary and value of their house if they own one. However, if the tokens are different from each node for the same individual in the two datasets, then the corresponding data values (e.g., salaries and property valuation) are not going to be aligned in the joined dataset.

Some features of the systems and methods of the present disclosure thus include that no single party of the SMPC network has knowledge of the salt/keys used during the token generation. Furthermore, an input (salt 110 or password 118) that is not stored within the SMPC platform is required to generate the tokens. Therefore, in the event of a breach on all SMPC compute engines within the SMPC platform, parts of the token generation process are still unknown, protecting the personal identifiable information. Because the methods are built on an SMPC platform, trusted and uncompromised nodes can detect some level of malicious activity if another node has been compromised.

It should be noted that using a tokenizer based on an initial hashing function means that there is a possibility of a collision occurring (same token generated) between two different inputs. If there was only a single party performing the tokenization, then a random mapping could be used to guarantee collisions do not occur. However, with multiple data sources performing part of the tokenization process, handling collisions is important. For example, if two pieces of information are incorrectly joined together (e.g., when computing a secure function) based on the colliding token, then results based upon the join are invalid—without knowledge of the fact that they are invalid.

The issue depends on the type of input data. For example, in Singapore, if a personal identification number or a phone number is being tokenized, then there is a near-zero chance of a collision, because the input space is small. Email addresses also have a maximum size and limited character set, so the probability of a collision is low. In cases where it is a possibility, even though slim, two or more separate tokens may be generated such that they use different salts and/or algorithms, thus reducing the chance that the token pair is the same.

With any tokenization method, where the tokens need to be generated by different parties, it opens the process up to a wider range of attacks. As mentioned previously, some data inputs have a limited input space. This makes brute forcing (i.e., generating all possible tokens), within a reasonable timeframe, feasible. Because of this, if someone were to gain access to the first salt value, and access to one of the compute nodes, they could input desirable values into the system, and record the output tokens, allowing them to find the data associated with correct token. However, because the actual meaningful data is split into secret shares, the infiltrator would then need to gain access to all the SMPC compute engines. Similarly if someone gained access to all the SMPC compute engines, but did not know the password/phrase used in the initial hashing process, then the tokens cannot be brute forced. This is the advantage of using a distributed system for token generation.

Because all the SMPC engines will be performing the same operations in order to compute the secret hash and/or encryption, then if the other SMPC engines notice the tokens being requested are not fed into a meaningful dataset or function, the engines may raise an alert that some suspicious activity is taking place. This cannot be said of other conventional tokenization methods or services, because they only create tokens; whereas here, the system has broader knowledge and can detect some levels of malicious behaviour. Furthermore, because the tokens need to be generated within the SMPC environment, the performance makes it harder to quickly generate all possible tokens.

Figure 3:
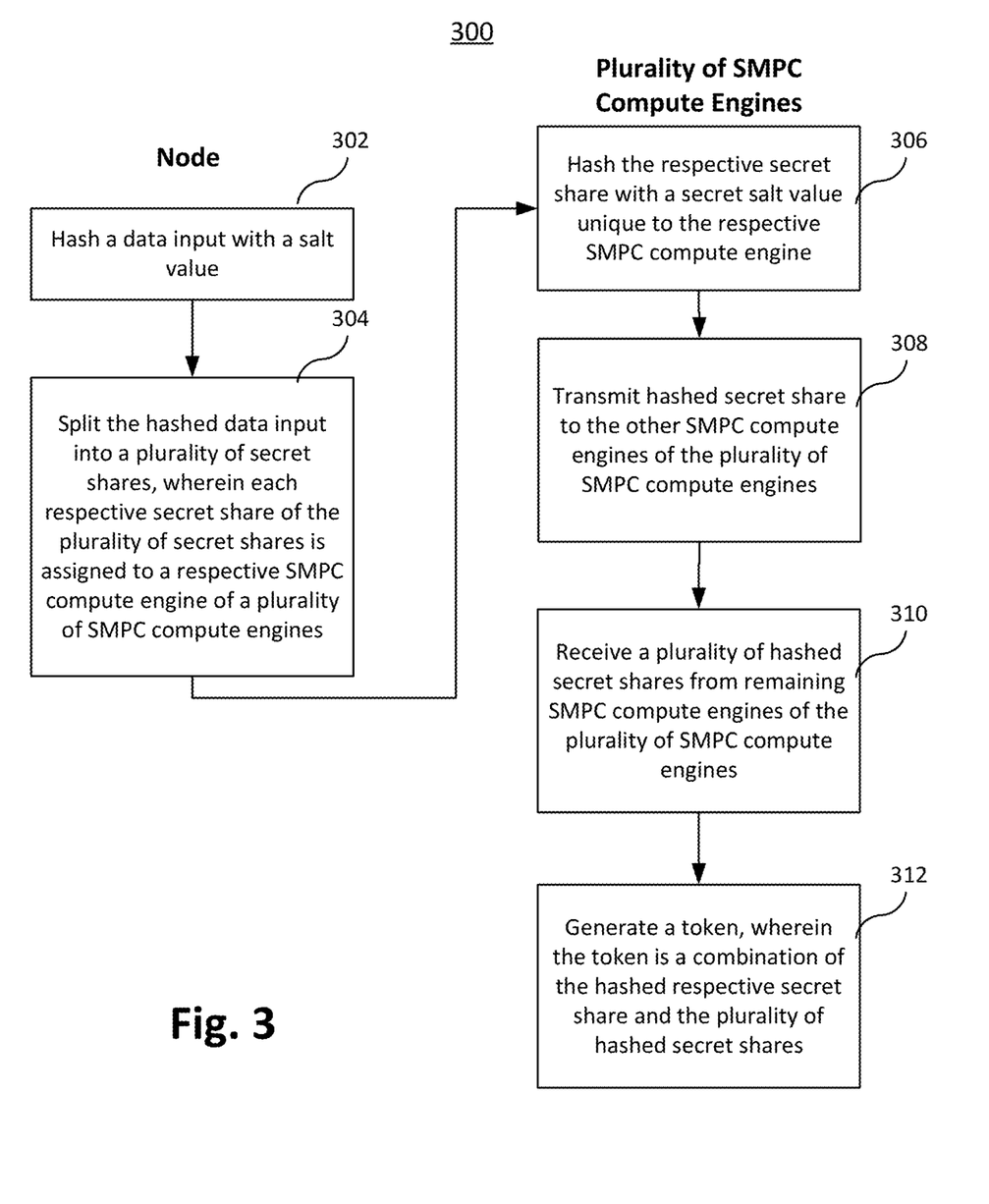
FIG. 3 illustrates a flow diagram of a method for a generating token for one source using SMPC compute engines, in accordance with aspects of the present disclosure.

FIG. 3 illustrates a flow diagram of method 300 for generating a token for one source using SMPC compute engines, in accordance with aspects of the present disclosure. At 302, a node (e.g., node 102) hashes a data input (e.g., ID 106) with a salt value (e.g., salt 110). At 304, the node splits the hashed data input into a plurality of secret shares (e.g., share A1, B1, . . . Z1), wherein each respective secret share of the plurality of secret shares is assigned to a respective SMPC compute engine (e.g., SMPC compute engine A, B, Z) of a plurality of SMPC compute engines. At 306, the respective SMPC compute engines (e.g., engine A) collectively hash the respective secret shares (e.g., share A1) with a secret salt value using SMPC protocols running on each of the plurality of SMPC compute engines. At 308, the respective SMPC compute engine transmits its respective hashed secret share to the other SMPC compute engines of the plurality of SMPC compute engines. At 310, the respective SMPC compute engine receives a plurality of hashed secret shares from the remaining SMPC compute engines (e.g., engine B, C, Z) of the plurality of SMPC compute engines. At 312, the respective SMPC compute engine generates a token, wherein the token is a combination of the hashed respective secret share and the plurality of hashed secret shares.

Figure 4:
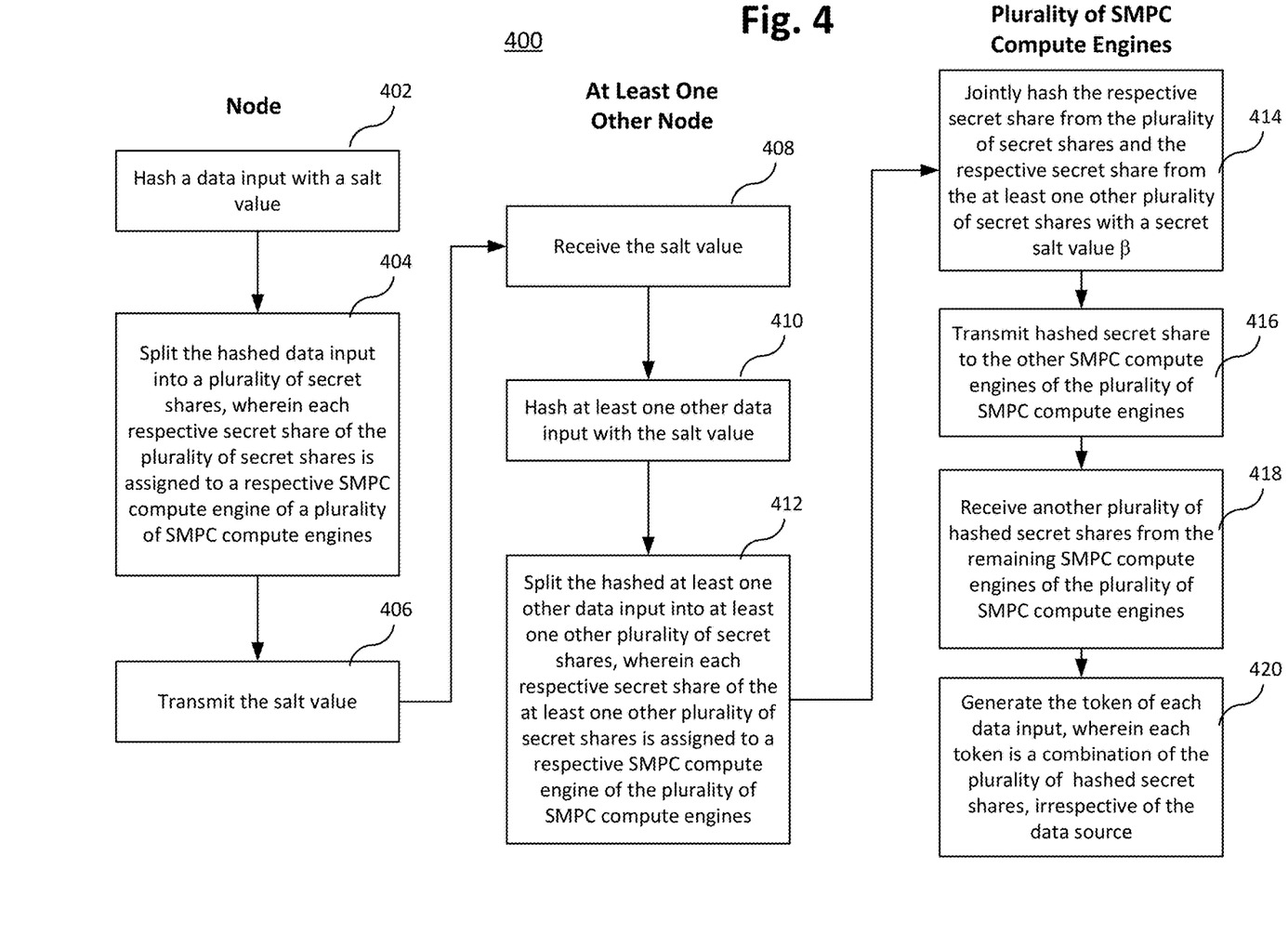
FIG. 4 illustrates a flow diagram of a method for a generating token for multiple sources using SMPC compute engines, in accordance with aspects of the present disclosure.

FIG. 4 illustrates a flow diagram of method 400 for a generating token for multiple sources using SMPC compute engines, in accordance with aspects of the present disclosure. At 402, a node (e.g., node 102) hashes a data input (e.g., ID 106) with a salt value (e.g., salt 110). At 404, the node splits the hashed data input into a plurality of secret shares (e.g., share A1, B1, Z1), wherein each respective secret share of the plurality of secret shares is assigned to a respective SMPC compute engine (e.g., SMPC compute engine A, B, Z) of a plurality of SMPC compute engines. At 406, the node transmits the salt value (e.g., via on-premise service 112), note this process could be manual or automatic.

At 408, at least one other node (e.g., node 104) receives the salt value (e.g., salt 110). At 410, the at least one other node hashes at least one other data input (e.g., ID 108) with the salt value. At 412, the at least one other node splits the hashed at least one other data input into at least one other plurality of secret shares (e.g., share A2, B2, . . . , Z2), wherein each respective secret share of the at least one other plurality of secret shares is assigned to a respective SMPC compute engine (e.g., SMPC compute engine A, B, Z) of the plurality of SMPC compute engines.

At 414, each respective SMPC compute engine (e.g., SMPC compute engine A) jointly hashes the respective secret share from the plurality of secret shares (e.g., from 404) and then the respective secret share from the at least one other plurality of secret shares (e.g., from 412) with a secret salt value 0 (i.e., the same secret shared salt value is used). At 420, each respective SMPC compute engine transmits the respective hashed secret share to the other SMPC compute engines of the plurality of SMPC compute engines. At 418, each respective SMPC compute engine receives another plurality of hashed secret shares from the remaining SMPC compute engines (e.g., SMPC compute engine B, C, Z) of the plurality of SMPC compute engines. At 420, each respective SMPC compute engine generates the token of each data input, wherein each token is a combination of the plurality of hashed secret shares, irrespective of the data source.

Figure 5:
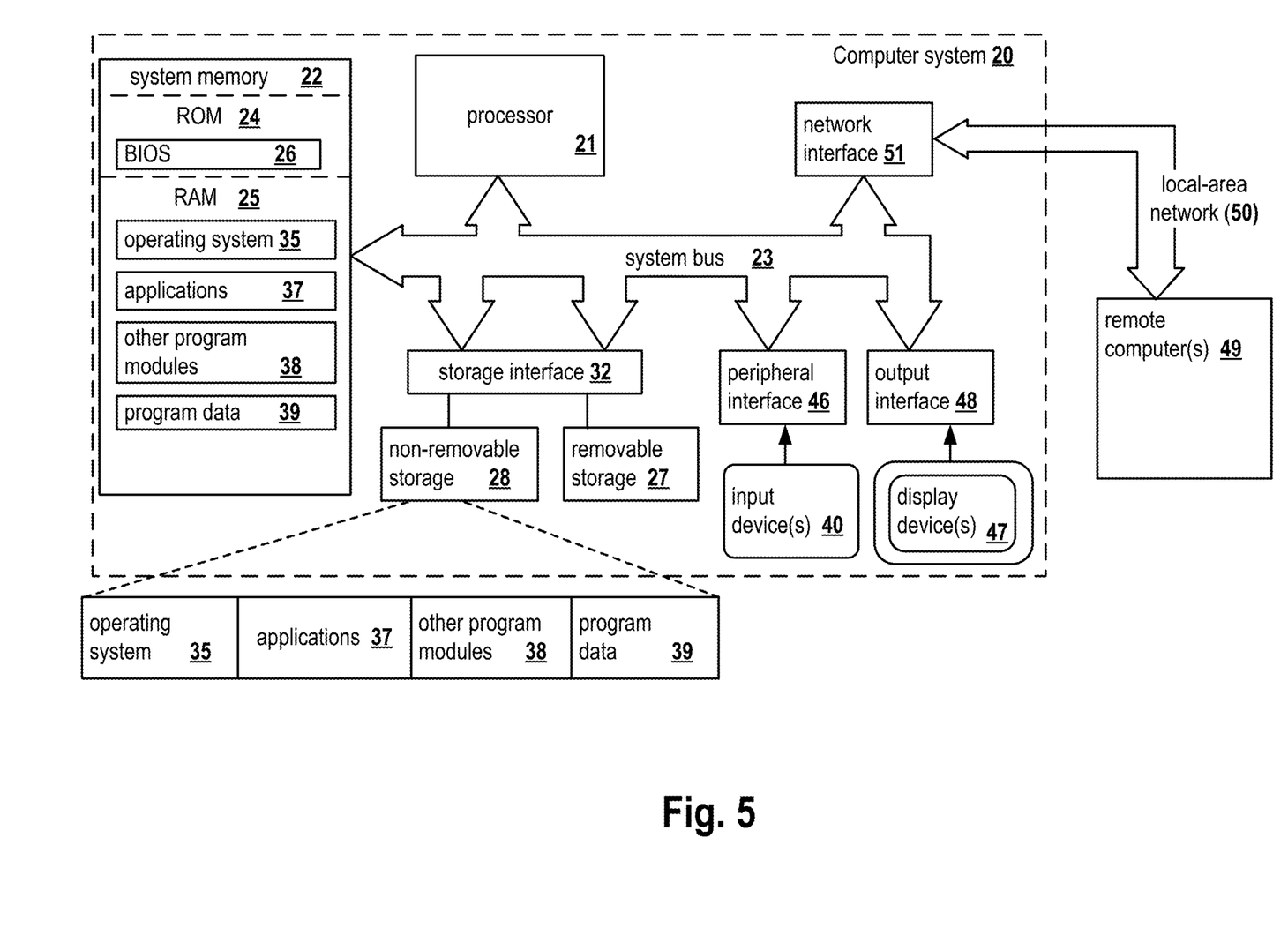
FIG. 5 presents an example of a general-purpose computer system on which aspects of the present disclosure can be implemented.

FIG. 5 is a block diagram illustrating a computer system 20 on which aspects of systems and methods for generating tokens using SMPC compute engines may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-4 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for token generation using secure multiparty computation (SMPC) compute engines, the method comprising:
hashing, by a node, a data input with a salt value;
combining the hashed data input with a passcode provided by a user of the node;
splitting, by the node, the hashed data input combined with the passcode into a plurality of secret shares, wherein each respective secret share of the plurality of secret shares is assigned to a respective SMPC compute engine of a plurality of SMPC compute engines,
wherein the respective SMPC compute engine is configured to:
securely hash the respective secret share with a secret salt value unique to the respective SMPC compute engine;
transmit the respective hashed secret share to the remaining SMPC compute engines of the plurality of SMPC compute engines;
receive a plurality of hashed secret shares from remaining SMPC compute engines of the plurality of SMPC compute engines;
generate a token, wherein the token is a combination of the hashed respective secret share and the plurality of hashed secret shares;
store a plurality of generated tokens with corresponding data inputs; and
in response to detecting that the stored plurality of generated tokens is being overwritten, generate an alert indicating malicious behaviour.

2. The method of claim 1, wherein the node is one data source of multiple data sources, wherein another token corresponding to data inputs from both the node and at least one other node of the multiple data sources should be generated, further comprising:
transmitting the salt value to the at least one other node, wherein the at least one other node is configured to:
hash at least one other data input with the salt value; and
split the hashed at least one other data input into at least one other plurality of secret shares, wherein each respective secret share of the at least one other plurality of secret shares is assigned to a respective SMPC compute engine of the plurality of SMPC compute engines.

3. The method of claim 2, wherein the respective SMPC compute engine is further configured to:
jointly, with the plurality of SMPC compute engines, hash the respective secret share from the plurality of secret shares with a secret salt value $\beta$ and hash the respective secret share from the at least one other plurality of secret shares with the secret salt value $\beta$, where $\beta$ is unknown to any SMPC compute engine of the plurality of SMPC compute engines;

transmit the respective hashed secret share to the remaining SMPC compute engines of the plurality of SMPC compute engines;
receive another plurality of hashed secret shares from the remaining SMPC compute engines of the plurality of SMPC compute engines; and
generate additional tokens, wherein each additional token is a combination of the plurality of hashed secret shares, irrespective of data source.

4. The method of claim 3, wherein the node and the at least one other node all receive the additional tokens.

5. The method of claim 1, wherein the data input is an identifier of a respective row or column in a dataset being uploaded by the node to the plurality of SMPC compute engines.

6. The method of claim 1, wherein the respective SMPC compute engine is further configured to:
securely encrypt the respective secret share using an encryption scheme, wherein an initialization vector and key of the encryption scheme are in a secret share and are unknown to any SMPC compute engine of the plurality of SMPC compute engines;
transmit the respective encrypted secret share to the remaining SMPC compute engines of the plurality of SMPC compute engines;
receive a plurality of encrypted secret shares from the remaining SMPC compute engines of the plurality of SMPC compute engines; and
generate the token, wherein the token is a combination of the encrypted respective secret share and the plurality of encrypted secret shares.

7. A system for token generation using secure multiparty computation (SMPC) compute engines, the system comprising:
a first hardware processor of a node;
a second hardware processor of an SMPC compute engine;
the first hardware processor configured to:
hash a data input with a salt value;
combine the hashed data input with a passcode provided by a user of the node;
split the hashed data input combined with the passcode into a plurality of secret shares, wherein each respective secret share of the plurality of secret shares is assigned to a respective SMPC compute engine of a plurality of SMPC compute engines,
wherein the second hardware processor of the respective SMPC compute engine is configured to:
securely hash the respective secret share with a secret salt value unique to the respective SMPC compute engine;
transmit the respective hashed secret share to the remaining SMPC compute engines of the plurality of SMPC compute engines;
receive a plurality of hashed secret shares from remaining SMPC compute engines of the plurality of SMPC compute engines;
generate a token, wherein the token is a combination of the hashed respective secret share and the plurality of hashed secret shares;
store a plurality of generated tokens with corresponding data inputs; and
in response to detecting that the stored plurality of generated tokens is being overwritten, generate an alert indicating malicious behaviour.

8. The system of claim 7, wherein the node is one data source of multiple data sources, wherein another token corresponding to data inputs from both the node and at least one other node of the multiple data sources should be generated, wherein the first hardware processor is further configured to:
transmit the salt value to the at least one other node, wherein a third hardware processor of the at least one other node is configured to:
hash at least one other data input with the salt value; and
split the hashed at least one other data input into at least one other plurality of secret shares, wherein each respective secret share of the at least one other plurality of secret shares is assigned to a respective SMPC compute engine of the plurality of SMPC compute engines.

9. The system of claim 8, wherein the second hardware processor of the respective SMPC compute engine is further configured to:
jointly, with the plurality of SMPC compute engines, hash the respective secret share from the plurality of secret shares with a secret salt value β and hash the respective secret share from the at least one other plurality of secret shares with the secret salt value β, where β is unknown to any SMPC compute engine of the plurality of SMPC compute engines;
transmit the respective hashed secret share to the remaining SMPC compute engines of the plurality of SMPC compute engines;
receive another plurality of hashed secret shares from the remaining SMPC compute engines of the plurality of SMPC compute engines; and
generate additional tokens, wherein each additional token is a combination of the plurality of hashed secret shares, irrespective of data source.

10. The system of claim 9, wherein the node and the at least one other node all receive the additional tokens.

11. The system of claim 7, wherein the data input is an identifier of a respective row or column in a dataset being uploaded by the node to the plurality of SMPC compute engines.

12. The system of claim 7, wherein the second hardware processor of the respective SMPC compute engine is further configured to:
securely encrypt the respective secret share using an encryption scheme, wherein an initialization vector and key of the encryption scheme are in a secret share and are unknown to any SMPC compute engine of the plurality of SMPC compute engines;
transmit the respective encrypted secret share to the remaining SMPC compute engines of the plurality of SMPC compute engines;
receive a plurality of encrypted secret shares from the remaining SMPC compute engines of the plurality of SMPC compute engines; and
generate the token, wherein the token is a combination of the encrypted respective secret share and the plurality of encrypted secret shares.

13. A non-transitory computer readable medium storing thereon computer executable instructions for token generation using secure multiparty computation (SMPC) compute engines, comprising instructions for:
hashing, by a node, a data input with a salt value;
combining the hashed data input with a passcode provided by a user of the node;
splitting, by the node, the hashed data input combined with the passcode into a plurality of secret shares, wherein each respective secret share of the plurality of secret shares is assigned to a respective SMPC compute engine of a plurality of SMPC compute engines,
wherein the respective SMPC compute engine is configured to:
  securely hash the respective secret share with a secret salt value unique to the respective SMPC compute engine;
  transmit the respective hashed secret share to the remaining SMPC compute engines of the plurality of SMPC compute engines;
  receive a plurality of hashed secret shares from remaining SMPC compute engines of the plurality of SMPC compute engines;
  generate a token, wherein the token is a combination of the hashed respective secret share and the plurality of hashed secret shares;
  store a plurality of generated tokens with corresponding data inputs; and
  in response to detecting that the stored plurality of generated tokens is being overwritten, generate an alert indicating malicious behaviour.

14. The non-transitory computer readable medium of claim 13, wherein the node is one data source of multiple data sources, wherein another token corresponding to data inputs from both the node and at least one other node of the multiple data sources should be generated, further comprising instructions for:
  transmitting the salt value to the at least one other node, wherein the at least one other node is configured to:
    hash at least one other data input with the salt value; and
    split the hashed at least one other data input into at least one other plurality of secret shares, wherein each respective secret share of the at least one other plurality of secret shares is assigned to a respective SMPC compute engine of the plurality of SMPC compute engines.

15. The non-transitory computer readable medium of claim 13, wherein the data input is an identifier of a respective row or column in a dataset being uploaded by the node to the plurality of SMPC compute engines.

* * * * *